United States Patent [19]

Sheetz

[11] 3,709,353
[45] Jan. 9, 1973

[54] CONVEYOR DIVERTER MECHANISM
[75] Inventor: Charles E. Sheetz, Woodstock, Va.
[73] Assignee: FMC Corporation, San Jose, Calif.
[22] Filed: July 21, 1971
[21] Appl. No.: 164,728

[52] U.S. Cl. .................................................198/28
[51] Int. Cl. ...........................................B65g 47/76
[58] Field of Search ...............198/28, 22 R, 188, 185

[56] References Cited

UNITED STATES PATENTS 2,614,707  10/1952  Bilterman ..........................198/188 X Primary Examiner—Edward A. Sroka
Attorney—F. W. Anderson et al.

[57] ABSTRACT

A smooth surfaced diverting blade extends transversely across an endless belt conveyor arranged to carry fruit. The blade is pivotally mounted at one edge thereof with the other edge being connected to a solenoid actuated lift assembly whereby the blade can be selectively maintained in either a first position wherein it lies flat upon the conveyor permitting the fruit to pass thereover or a second position wherein it is pivoted upwardly to block the path of the fruit on the conveyor thereby causing the fruit to be diverted therefrom.

14 Claims, 5 Drawing Figures

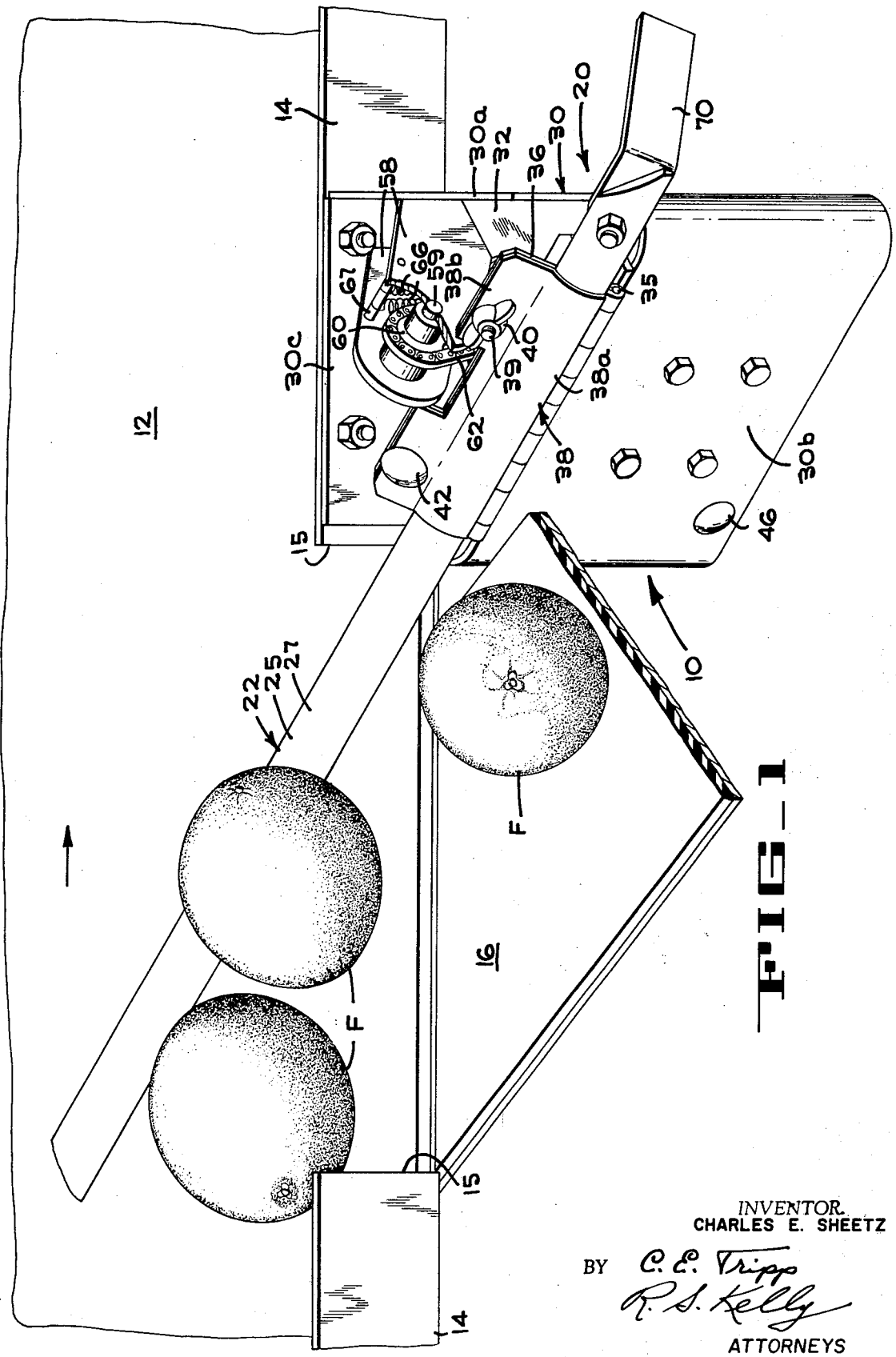

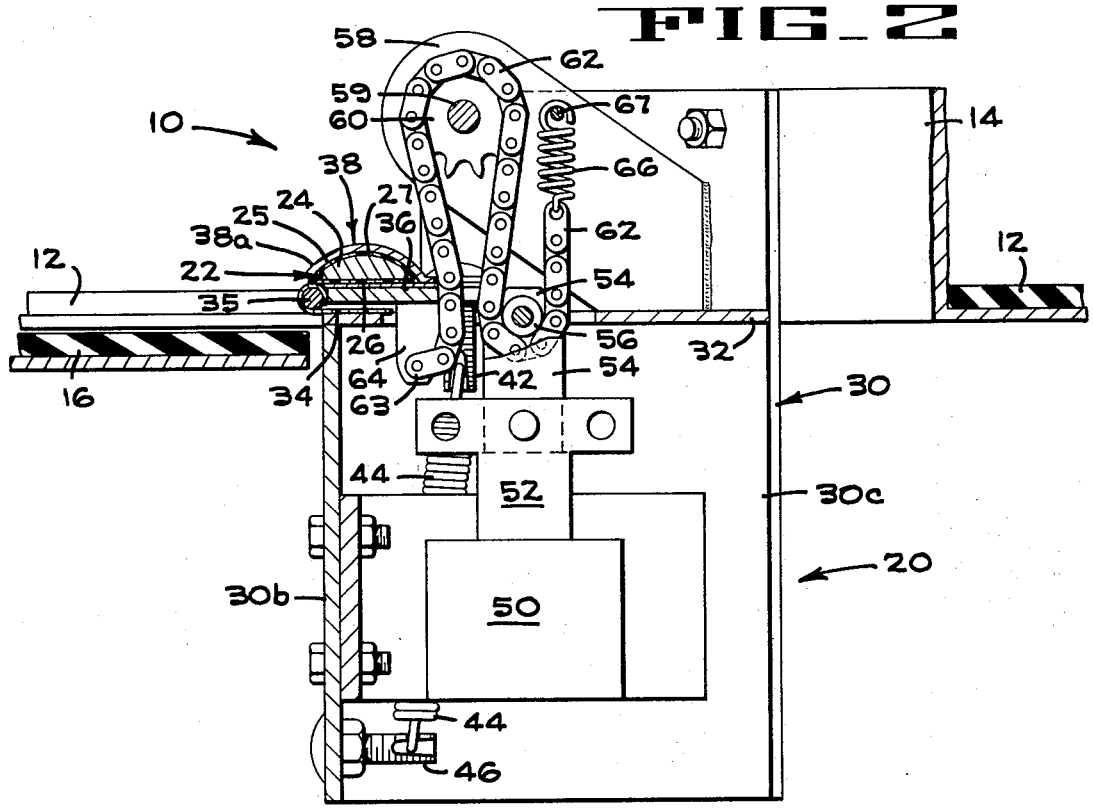
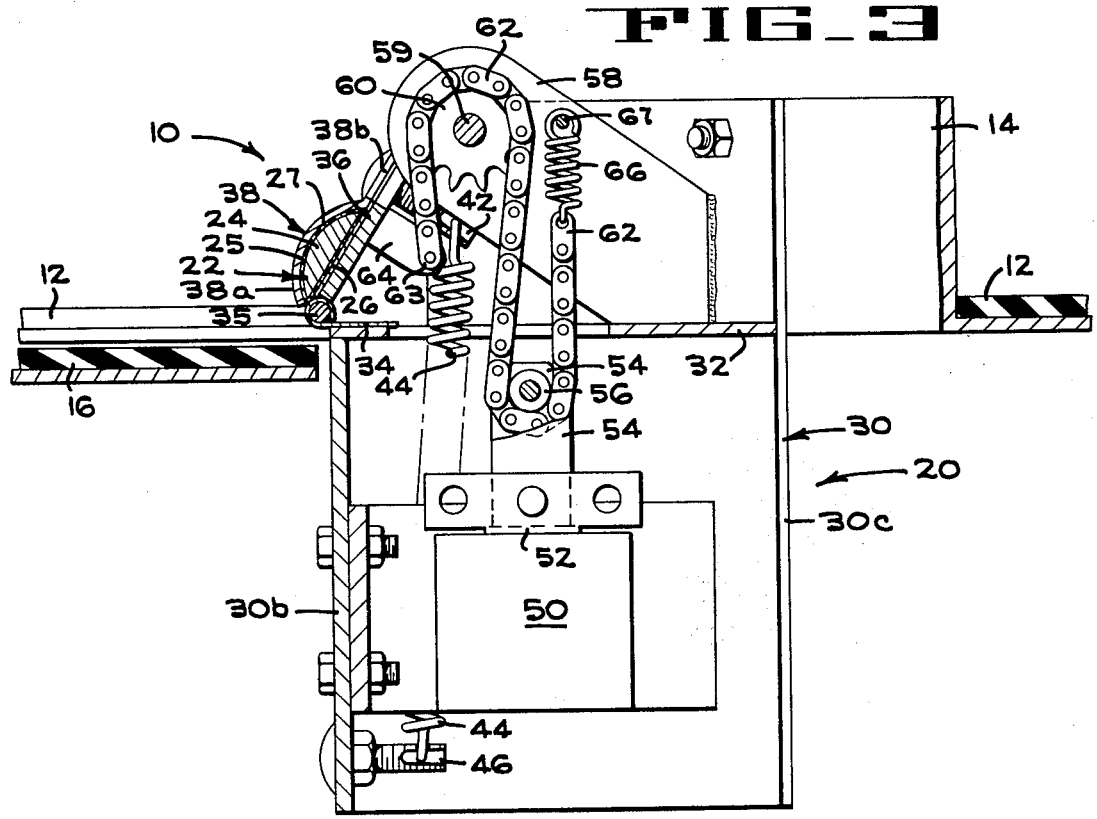

PATENTED JAN 9 1973 3,709,353
SHEET 3 OF 3
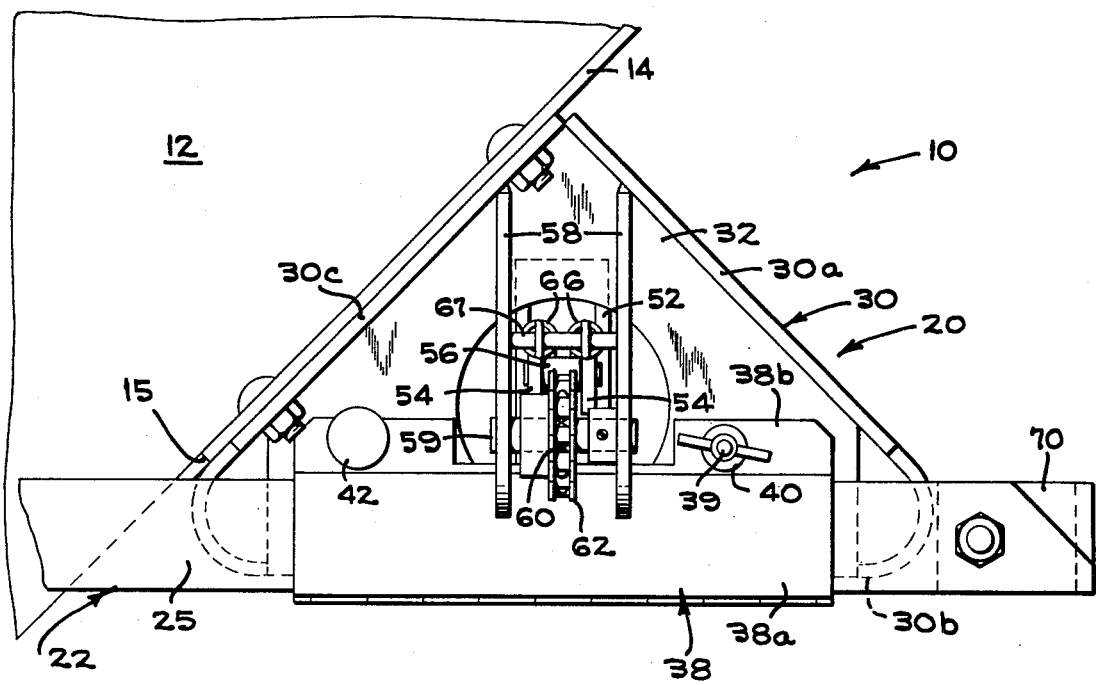
FIG_4
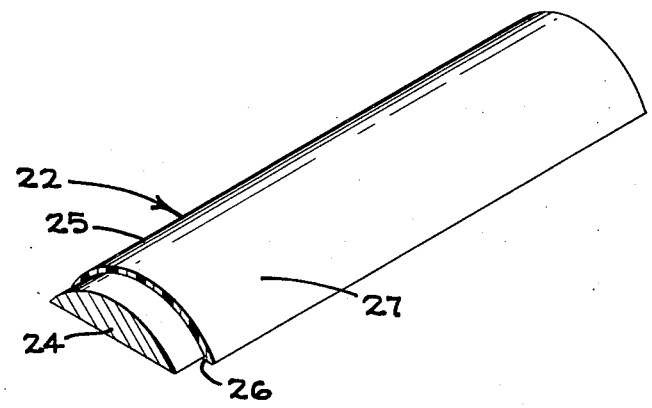
FIG_5

CONVEYOR DIVERTER MECHANISM

BACKGROUND OF THE INVENTION

1. Field of the Invention

The present invention pertains to conveyors, and more particularly, it pertains to mechanisms for selectively diverting articles from conveyors.

2. Description of the Prior Art

Fruit, and objects of a similar somewhat fragile nature, are often conveyed by endless belt conveyors during packing or processing operations. When it is desired to transfer fruit from one belt type of conveyor to another or from a belt type conveyor to a packaging or processing machine, the fruit is ordinarily diverted from the conveyor belt by means of a fixed diverting member which is arranged at an acute angle to the belt so that the fruit, upon engagement with the diverting member, will be urged laterally and forwardly until it is ejected from the side of the belt. Such belt type conveyors and diverting members, as used in the conveying and handling of apples for example, are shown in U.S. Pat. No. 1,445,797 to Pierce.

In modern fruit handling operations, packing stations and special container filling or fruit processing equipment is typically designed to operate in a manner such that fruit is required to be fed thereto only during certain periods of operation while during other periods of operation fruit cannot be accepted. In order to provide fruit for such equipment from endless conveyor belts of the conventional type, selectively operable equipment is utilized which can be operated to provide a diverting means upon the conveyor belt blocking the path of the fruit thereon when it is desired to divert such fruit from the belt and which can be removed from its position blocking the path of the fruit on the conveyor belt when it is desired that no fruit be diverted therefrom. Heretofore such selective fruit or other object diverting mechanisms have generally been of a type wherein a diverting member is pivotally mounted adjacent to the side of the conveyor and wherein the diverting member is arranged to be pivoted from a position in general alignment with the side of the conveyor to a position extending transversely across the conveyor so as to block the paths of the fruit or other objects thereon and cause their diversion. Such conventional diverting apparatus is shown, for example, in U.S. Pat. Nos. 2,445,741 to Dodge, 3,139,965 to Eggert, 2,998,117 to Newburn, or 3,198,308 to Driesch et al.

Problems which have been encountered with the aforedescribed conventional conveyor diverting mechanisms include the problem of accommodating the amount of time necessary to move the diverting member from its inactive position out of the conveyor path to its active position across the conveyor path. This requisite movement limits the capabilities of the diverting member so that it does not provide a fast enough response for some system requirements. Furthermore, the swinging movement of the diverting member can have a damaging effect upon relatively fragile objects, such as fresh fruit, which the diverting member can bruise or cut during its actuating and deactuating movement particularly since such objects are generally conveyed at random along the flat belt conveyor and their position at any given time with respect to the diverting member will not be known. Finally, the lengthy swinging movements of such diverting members require operating mechanisms which are subject to malfunction or breakdown during operation.

SUMMARY OF THE INVENTION

With the diverting mechanism of the present invention, a device is provided which is distinctly different from the diverting mechanisms of the prior art in that a diverter blade member is provided which is not positioned out of the conveyor path in its unactuated position. Instead, the diverter blade is arranged to lie flat, generally in the plane of the conveyor, and is configured so that the fruit or other objects on the conveyor will pass thereover. When it is desired to divert fruit or other objects from the conveyor belt, pivotal means are provided for pivoting the diverter blade member about one edge thereof so that the other edge is lifted to cause the blade to form an abutment in the p[th of the objects moving upon the conveyor.

Thus, the conveyor diverter mechanism of the present invention assures positive timed feed of fruit or other objects from a moving belt type conveyor. This feed is accomplished in a minimum time and with a minimum disturbance to the objects being conveyed. Since the actual required movement of the diverter blade member is small, relatively inexpensive but dependable operating means may be used for selectively controlling such movement.

It is a special feature of the present invention that the diverter blade member is adjustable in length so that it can be used on a wide variety of different conveyors. Furthermore, the mounting frame for the diverter blade member, which is adapted to be attached to the side of the conveyor frame, is provided with selective mounting positions so that the diverter blade member can be alternatively used for diverting fruit from a given conveyor regardless of which direction the conveyor is moving.

Finally, in the preferred version of the invention, the diverter blade member is provided with a particular configuration and a low friction covering so as to reduce as much as possible the disturbance to the conveyed product while the blade member is unactuated without defeating its qualities as a diverter during the actuated condition thereof.

BRIEF DESCRIPTION OF THE DRAWINGS

FIG. 1 is an isometric view of the diverter mechanism of the present invention illustrating its use in diverting fruit from a moving endless belt conveyor.

FIG. 2 is a vertical section through the diverter mechanism shown in FIG. 1 but illustrating the unactuated condition of the blade member.

FIG. 3 is a vertical section through the diverter mechanism, similar to FIG. 2, but showing the blade member in its actuated position.

FIG. 4 is a plan of the diverter mechanism of the present invention.

FIG. 5 is a fragmentary isometric view of a portion of the blade member used with the diverter mechanism of the present invention.

DESCRIPTION OF THE PREFERRED EMBODIMENT

Referring now more particularly to the drawings, FIG. 1 shows the diverter mechanism 10 of the present invention as used to divert fruit F from a conventional endless conveyor belt 12, only a portion of which is shown. As is also conventional, the conveyor belt is arranged to be continuously moved in the direction of the arrow (FIG. 1) within a pair of side frame members 14 (only one of which is shown in FIG. 1). A section of one of the side frame members is removed, as at 15, in order to provide for the diversion of the fruit from the conveyor belt, and a ramp 16 is positioned adjacent to the conveyor belt and extending downwardly therefrom and at an approximate 45° angle with the direction of movement of the conveyor belt.

The diverter mechanism 10 basically comprises a frame unit 20, which is arranged to be bolted to the side frame member 14 of the conveyor, and a diverter blade 22 which is mounted at one end thereof upon the frame unit in a manner such that the other end extends transversely across the conveyor belt 12 and at an approximate 45° angle thereto in alignment with the ramp 16 so that the fruit, upon contact with the blade in its actuated position, will be progressively moved laterally of the belt as the belt moves forwardly and will be directed off of the belt and onto the diverting ramp 16.

It is a particularly important feature of the present invention that the diverter blade 22, while arranged to selectively divert or not divert fruit from the conveyor belt 12, is not mounted so that it is movable away from the conveyor belt as is the case with conventional conveyor diverting members. Instead of this conventional structure, the blade is pivotally mounted so that it can pivot between two positions--a first position wherein it lies flat upon the surface of the conveyor belt so that the fruit on the belt can pass over it without being impeded, and a second position wherein it is pivoted upwardly about one edge thereof so that its widest transverse dimension lies at an angle to the plane of the conveyor belt and forms an abutment for preventing the passage of fruit or other objects along the conveyor belt.

The structure of the blade itself is such that it will permit fruit or other objects moving on the conveyor to pass readily over it when it is in its unactuated position, and yet it will be strong enough to form a firm abutment when it is moved to its actuated position. The blade, as particularly shown in FIG. 5, is preferably formed as an arcuate segment having a hard core 24 of metal, or similar rigid material, with a covering 25 of a durable but low friction material. An excellent material for the covering has proven to be a fiber glass tape impregnated with Teflon. This cover material is strong enough to withstand the abrasiveness of the conveyor belt and the fruit or other objects that are moved on the conveyor, and yet it is a relatively low friction material which will allow fruit to pass easily over it without cutting or otherwise damaging the skin of the fruit.

With its arcuate segment shape, the diverter blade 22 has a lower flat surface 26 and an upper arcuate surface 27 when it is in its normal unactuated position, as shown in FIG. 2. When the blade is pivoted, the arcuate surface 27 is moved upwardly so that it forms an abutment surface across the conveyor belt to block the passage of the fruit F, as shown in FIG. 3 for example.

The means for mounting the blade 22 and for pivoting the blade are contained within the frame unit 20 that is bolted to the side frame member 14 of the conveyor. This frame unit includes a generally triangularly shaped frame member 30 (FIG. 4) which includes three connected vertical wall portions 30a, 30b and 30c, the latter of which is bolted at the top thereof to the adjacent conveyor side frame member. A top plate 32 extends between and is affixed to the wall portions at the top edges thereof so as to form a support for the blade mounting and pivoting mechanisms. In order to provide the pivotal mounting for the blade, it will be noted that a hinge bracket 34 is mounted atop the plate 32 directly above and in alignment with the wall portion 30b of the frame. This hinge bracket rotatably supports a hinge pin 35. Also rotatably mounted upon the hinge pin is a flat hinge plate 36 which is arranged to engage and underlie the lower flat surface 26 of the diverter blade 22 at one end thereof. A clamp plate 38, of generally the same dimensions as the hinge plate 36, is arranged to overlie the secured end of the diverter blade and includes an arcuate portion 38a which overlies the arcuate surface 27 of the blade and a flat portion 38b which is secured to the free end of the hinge plate 36. The clamp plate and hinge plate are releasably secured together by means of a bolt 39 and a wing nut 40 in order to hold the blade therebetween and permit it to be pivoted about the axis of the hinge pin 35. As will be obvious, by loosening the wing nut 40, the blade can be shifted longitudinally between the plates within the space provided by the arcuate portion 38a of the clamp plate to thereby increase or decrease its length with respect to the conveyor belt 12. Also, by loosening the wing nut 40, the diverter blade can be readily replaced if so desired. A bolt 42 also extends through the connected portions of the clamp plate and the hinge plate, and the lower end of this bolt (FIGS. 2 and 3) secures a tension spring 44 the other end of which is attached to a fixed bolt 46 affixed to the lower end of the frame unit 20. Tension spring 44 thereby serves to maintain the blade in its unactuated position, i.e., wherein the lower flat surface 26 thereof is in engagement with the top of the conveyor belt 12.

In order to pivot the diverter blade 22 into its actuated position, a conventional solenoid 50 of the pull type is provided and is bolted to the interior of the wall portion 30b of the frame member 30. This solenoid can be selectively energized (by conventional electrical switching means, not shown) to control the actuating movement of the blade. Upon de-energization of the solenoid, the diverter blade will be returned to its unactuated position by the tension spring 44 as previously explained. The solenoid includes a plunger unit 52 which is provided with a pair of parallel upstanding ears 54 between which a roller bearing 56 is rotatably mounted. Mounted upon the top plate 32 of the frame unit 20 are a pair of upstanding brackets 58 which mount therebetween a fixed shaft 59 adjacent the outer ends thereof, and a sprocket unit 60 is rotatably secured about this shaft. A chain 62 is wrapped about the roller bearing 56, which is connected to the solenoid, and about the sprocket 60 on the frame unit so that one end 63 of the chain is in a position to provide a lifting means for the free edge of the diverter blade. This chain end is connected to a mounting post 64 which is attached to the underside of the hinge plate 36, as shown in FIGS. 2 or 3. The opposite end of the chain 62 is connected by a pair of springs 66 to a post 67 secured between the upstanding brackets 58 of the frame unit.

As shown in FIGS. 2 and 3, when the solenoid 50 is energized, the plunger unit 52 will be retracted and the roller bearing 56 carried thereby will provide a downward force upon the chain 62 which will rotate the chain and the sprocket 60 about the axis of the shaft 59 to thereby lift the end 63 of the chain and elevate the free edge of the diverter blade. The relative tension in the securing springs 66 and the return spring 44 is such that this lifting movement of the chain end 63 is accomplished. As previously pointed out, upon de-energization of the solenoid, the tension spring 44 will return the blade to its unactuated position, as shown in FIG. 2, thereby pulling the chain 62 back to its relatively unstressed position ready for subsequent actuation. If desired, a detachable handle 70 may be bolted to the second end of the blade, as shown in FIG. 1, in order to provide for manual actuation of the diverter mechanism.

One special feature of the diverter mechanism 10 of the present invention is its adaptability to conveyor belts which may be run in either direction. As pointed out previously, the wall portion 30c of the frame member 30 is adapted to be bolted to the side frame member 14 of the conveyor. This will place the diverter blade 22 at a 45° angle with the conveyor belt 12 so that objects moving with the conveyor belt will be diverted therefrom. However, the wall portion 30a of the frame unit is also adapted to be mounted to the side frame member of the conveyor if so desired. Thus, if the conveyor belt 12, as shown, were run in the opposite direction (i.e., in a direction opposite to that indicated by the arrow in FIG. 1), the diverter mechanism would be moved to the opposite side of the opening 15 in the conveyor side frame member, and the wall portion 30a of the frame unit would be bolted to the side frame member. The diverter blade would then be reversed in its pivotal mounting means between the hinge plate 36 and the clamp plate 38 so that it would extend in the proper direction with regard to the movement of the conveyor belt to again cause the objects moving with the conveyor belt to be diverted at an approximate 45° angle therefrom to the diversion ramp 16.

From the foregoing description it will be appreciated that a diverter mechanism is provided by the present invention which is particularly useful for the rapid and efficient selective diversion of objects from conveyors of the endless belt type. Since means are not required to pivot the entire blade structure from a position alongside the conveyor to a blocking position over the conveyor, the diverting blade can be very rapidly brought into its actuated position to cause diversion of the objects moving with the conveyor. The configuration of the blade and its pivotal mounting structure are such that the actuation of the blade can be accomplished without damaging the objects moving with the conveyor or without damaging the blade itself even with a generally full supply of objects on the conveyor. It has also been pointed out wherein the mounting structure for the diverter blade is adaptable to conveyors arranged to move in either longitudinal direction and is also readily adjustable to accommodate differently sized conveyors.

Although the best mode contemplated for carrying out the present invention has been herein shown and described, it will be apparent that modification and variation may be made without departing from what is regarded to be the subject matter of the invention.

What is claimed is:

1. A diverter for use with an endless belt type conveyor, said diverter comprising a blade member arranged to be positioned atop and transversely of said conveyor in a position to intercept the objects carried by said conveyor, means for pivotally mounting one edge of said blade member, and lift means operatively connected to said blade member at a position spaced transversely of said member from said pivotal mounting means for moving said member between a first position wherein it lies generally in the plane of said conveyor so as to permit said objects to pass thereover and a second position wherein it is pivoted upwardly about said one edge into a position to block the paths of said objects on said conveyor and divert said objects from said conveyor.

2. A diverter according to claim 1 wherein said blade member has a cross sectional configuration of an arcuate segment wherein in said first position a flat lower surface of said blade member lies adjacent to said conveyor and an arcuate upper surface of said blade provides a low barrier over which said objects can pass.

3. A diverter according to claim 2 wherein said blade member includes a covering of a low friction material.

4. A diverter according to claim 1 wherein said means for pivotally mounting said blade member comprises a pair of plates, means for clamping one pair of adjacent edges of said plates together to releasably secure one end of said blade member therebetween, a hinge connected to at least one of the other pair of adjacent edges of said plates, and means for mounting said hinge adjacent to and generally in the plane of said conveyor so that said blade member extends across said conveyor.

5. A diverter according to claim 4 wherein said means for mounting said hinge comprises a frame member having three connected wall portions defining a generally triangularly shaped cross section, said hinge being mounted upon one of said wall portions and in alignment therewith so that said blade member extends at an acute angle with the adjacent side of the conveyor and in the upstream direction on said conveyor, and means for mounting one of the other wall portions of the frame member to the side of the conveyor.

6. A diverter according to claim 1 wherein said means for pivotally mounting said blade member is positioned adjacent to and laterally of said conveyor, said pivotal mounting means being positioned so that said blade member extends at an acute angle with the adjacent side of the conveyor and in the upstream direction on said conveyor.

7. A diverter according to claim 1 including a frame member for mounting one end of said blade member adjacent to and laterally of said conveyor, said lift means being mounted on said frame member and including a solenoid.

8. A diverter according to claim 7 wherein said lift means comprises a chain operatively connected to said blade member, said solenoid being operatively attached to said chain so as to cause the end connected to the blade member to move upwardly upon the actuation of the solenoid to thereby move said blade member into its said second position, and spring means attached between said blade member and said frame member for returning said blade member to its said first position upon deactuation of said solenoid.

9. A diverter according to claim 8 wherein said means for pivotally mounting said blade member comprises a pair of plates, means for clamping one pair of adjacent edges of said plates together to releasably secure one end of said blade member therebetween, a hinge connected to at least one of the other adjacent edges of said plates, and means for mounting said hinge upon said frame member, said chain being attached to said one pair of adjacent edges of said plates.

10. A diverter for use with an endless belt type conveyor, said diverter comprising a blade member, a frame member having three connected wall portions defining a generally triangularly shaped cross section, means for pivotally mounting one end of said blade member upon one of said wall portions so that the blade member extends generally in the plane of said one wall portion, said pivotal mounting means being attached to the blade member so as to cause pivotal movement about one edge of said blade member, lift means mounted on said frame member and operatively connected to said blade member at a position spaced transversely of the blade member from said one edge thereof in order to pivot said blade member about said one edge between an unactuated position wherein said blade member lies in a generally flat position in the plane of said conveyor and an actuated position wherein the blade member lies generally in a plane at an angle with the plane of the conveyor to block the movement of articles upon said conveyor, means for selectively mounting one of the other of said wall portions upon the side of said conveyor so as to position said blade member transversely of said conveyor and at an acute angle thereto, and means for actuating said lift means to move said blade member between the actuated and unactuated positions.

11. A diverter according to claim 10 wherein said blade member has a cross sectional configuration of an arcuate segment with a flat surface adapted to overlie the conveyor in the unactuated position of the blade member and an arcuate surface adapted to block the movement of said articles upon the conveyor in the actuated position of the blade member.

12. A diverter according to claim 11 wherein said blade member includes a covering of a low friction material.

13. A diverter according to claim 11 wherein said means for pivotally mounting said blade member comprises a flat plate underlying said flat surface of the blade member in its unactuated position, a cover plate having an arcuate portion adapted to overlie the blade member in its unactuated position and a flat portion, means for releasably clamping said flat portion of the cover plate to said flat plate to releasably secure the blade member therebetween, and a hinge connected to at least one plate of one adjacent pair of edges of said flat plate and said cover plate for pivotally mounting said plates to said frame member.

14. A diverter according to claim 13 wherein said lift means includes a chain connected at one end thereof to one of said plate members in the area where they are releasably clamped together, and said means for actuating said lift means includes a solenoid connected to said chain so as to cause said one end thereof to be elevated upon actuation of said solenoid.

* * * * *